April 23, 1929. H. G. WOLFE 1,710,676
WATER WALL
Filed July 13, 1926  4 Sheets-Sheet 1

INVENTOR
Henry G. Wolfe
BY Rogers, Kennedy & Campbell,
ATTORNEYS.

April 23, 1929. H. G. WOLFE 1,710,676
WATER WALL
Filed July 13, 1926 4 Sheets-Sheet 2
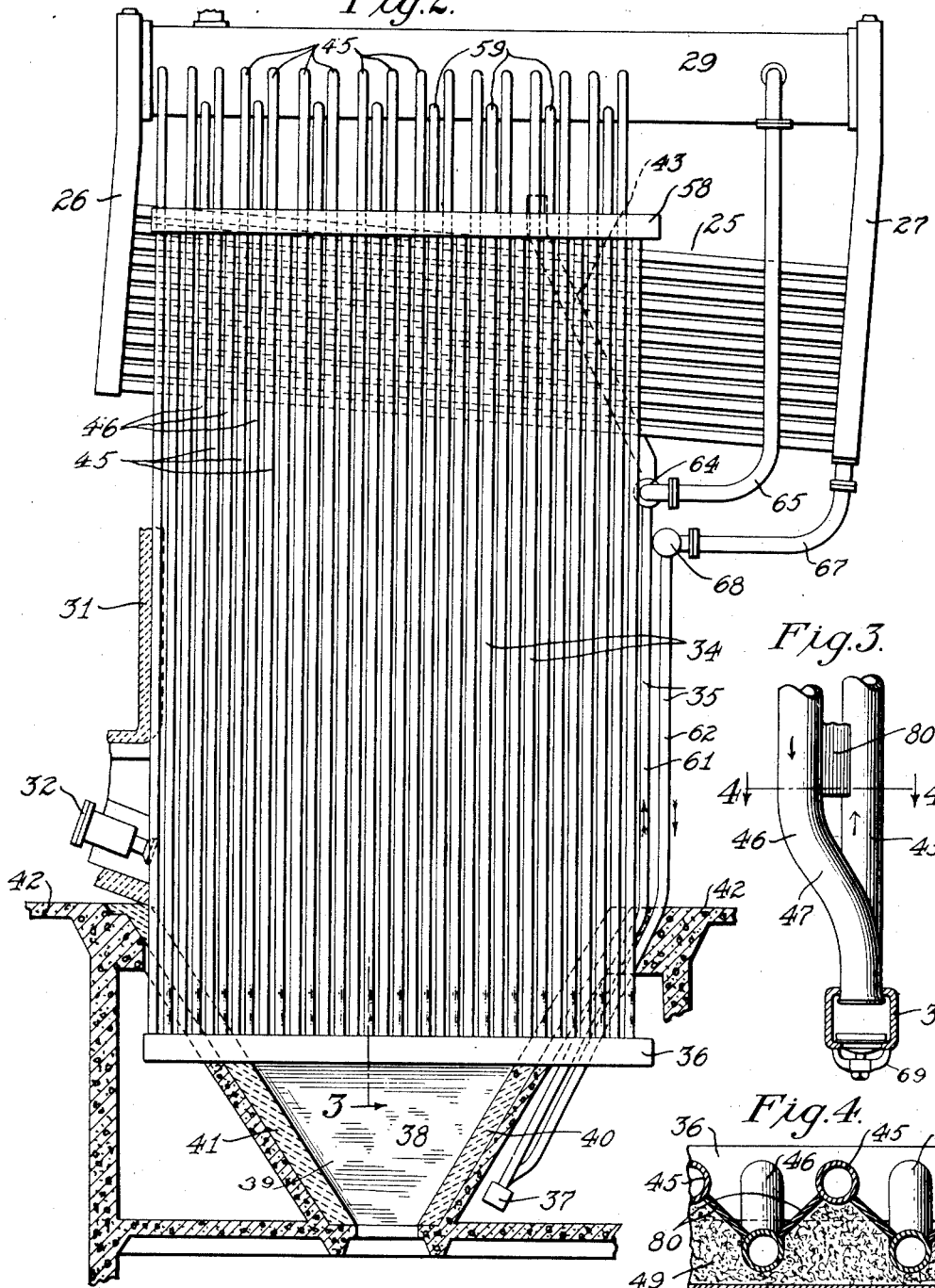
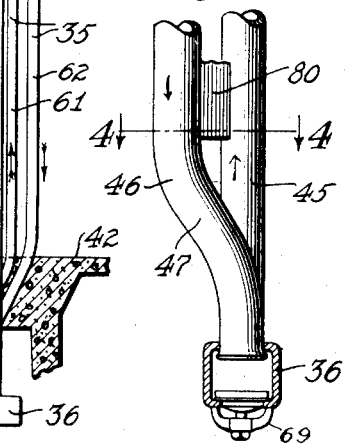
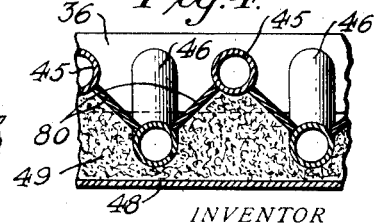
INVENTOR
Henry G. Wolfe
BY Rogers, Kennedy & Campbell
ATTORNEYS.

April 23, 1929.  H. G. WOLFE  1,710,676
WATER WALL
Filed July 13, 1926  4 Sheets-Sheet 3
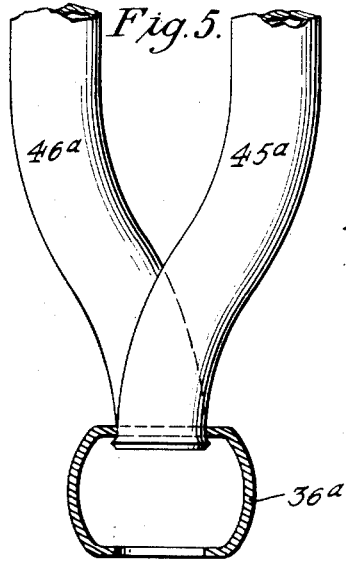
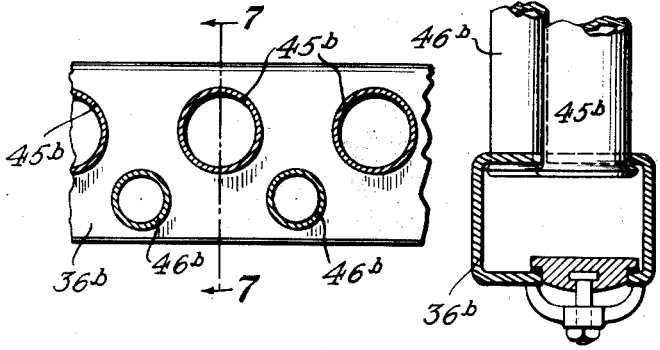
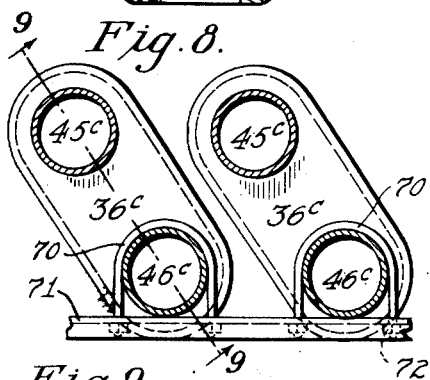
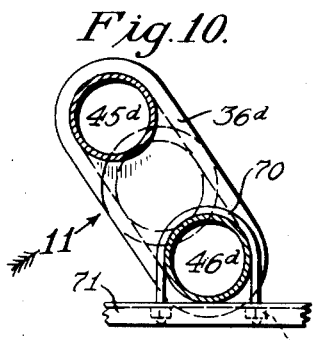
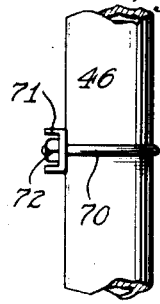
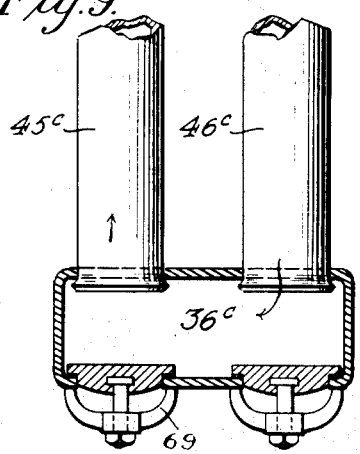
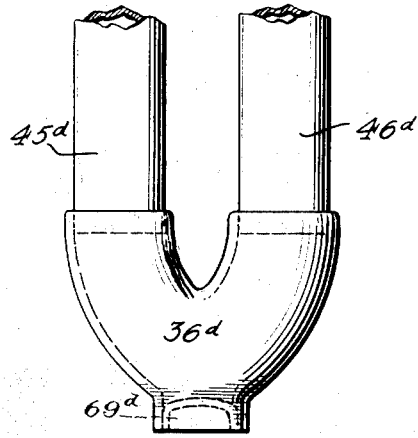
INVENTOR
Henry G. Wolfe
BY Rogers, Kennedy & Campbell
ATTORNEYS.

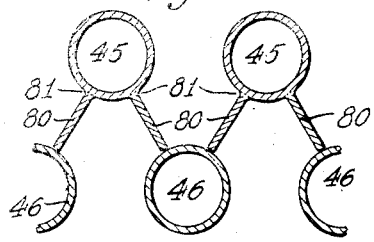
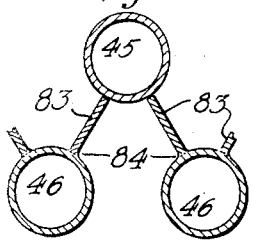
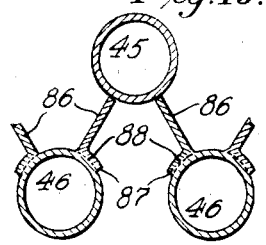
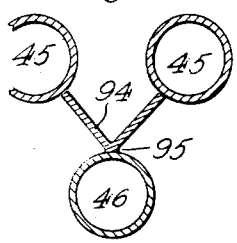
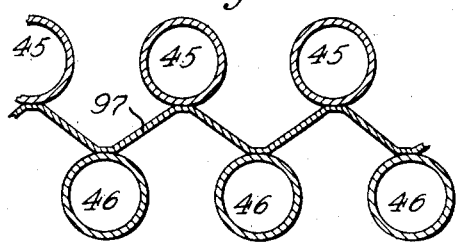
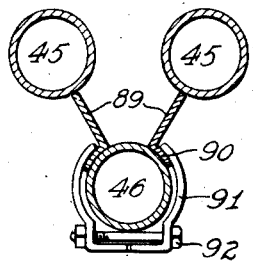
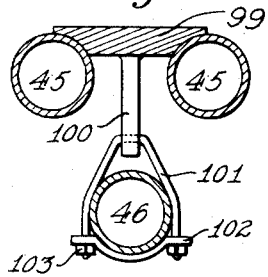
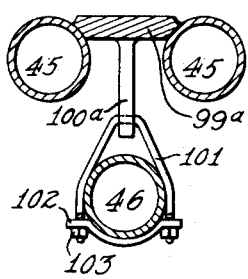
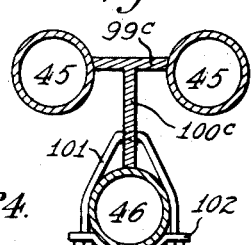
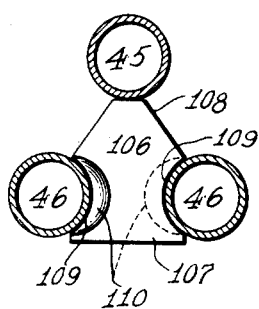
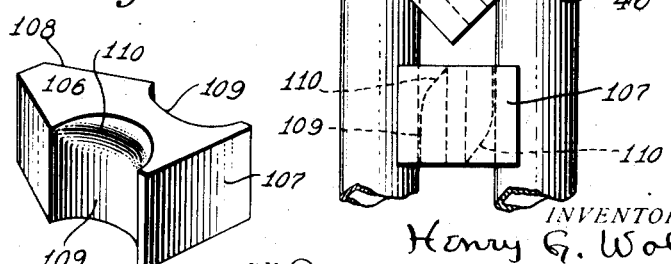

Patented Apr. 23, 1929.

1,710,676

UNITED STATES PATENT OFFICE.

HENRY G. WOLFE, OF WHITE PLAINS, NEW YORK, ASSIGNOR TO EDGE MOOR IRON COMPANY, A CORPORATION OF DELAWARE.

WATER WALL.

Application filed July 13, 1926. Serial No. 122,127.

This invention is a novel water wall, pertaining for example to the furnace or combustion chamber of a water tube boiler, or other type of boiler, the wall containing tubes or passages through which water, preferably the boiler water, is circulated to produce or increase evaporation and to prevent overheating of the wall, thus prolonging its life. Especially the herein disclosed illustrative embodiment is designed for use with extremely high service installations, wherein the boiler is to be operated at many times its normal rating; the water wall arranged facing the flames, and comprising tubes spaced apart, the spaces closed by suitable means.

The general object of the present invention is to improve the operation and efficiency of furnace water walls, and more particularly by improving or increasing circulation within the wall passages, increasing evaporation and reducing foaming. A further object is to improve the mode of construction and assemblage of the elements of a closed water wall, particularly in respect to the arrangement of the water wall tubes, the mode of closure of the spaces between the tubes, the exposure thereof to the radiant heat, and the interconnection and mounting of the several elements of the wall. Other and further objects and advantages will be explained in the following description of certain embodiments of the invention or will be apparent to those skilled in the subject.

To the attainment of the objects and advantages referred to the present invention consists in the novel water wall, and the novel features of construction, arrangement, operation, combination and detail herein illustrated or described.

In the accompanying drawings Fig. 1 is a front elevation of a steam generating apparatus embodying this invention, the boiler being for illustration of the horizontal water tube type, and the furnace or combustion chamber being provided with rear and side water walls embodying the invention, the front wall and outer enclosing walls being omitted.

Fig. 1ª is a similar view of the upper left corner of Fig. 1, modified as to the water wall connections and circulation.

Fig. 2 is a right hand elevation of the apparatus shown in Fig. 1.

Fig. 3 is a vertical section taken on the line 3—3 of Fig. 2, looking from the front.

Fig. 4 is a horizontal section taken on the line 4—4 of Fig. 3, looking from above.

Fig. 5 is a view similar to Fig. 3 showing a modified construction.

Fig. 6 is a view similar to Fig. 4, showing a further modification, and Fig. 7 is a vertical section taken on the line 7—7 of Fig. 6.

Fig. 8 is a view similar to Fig. 4 showing a modified construction, and Fig. 9 is a vertical section taken on the line 9—9 of Fig. 8.

Fig. 10 is a view similar to Fig. 4 showing a further modification, and Fig. 11 is an elevation thereof looking in the direction of the arrow 11 on Fig. 10.

Fig. 12 is an elevation view showing the nature of the clamp indicated in Figs. 8 and 10.

Figure 1:
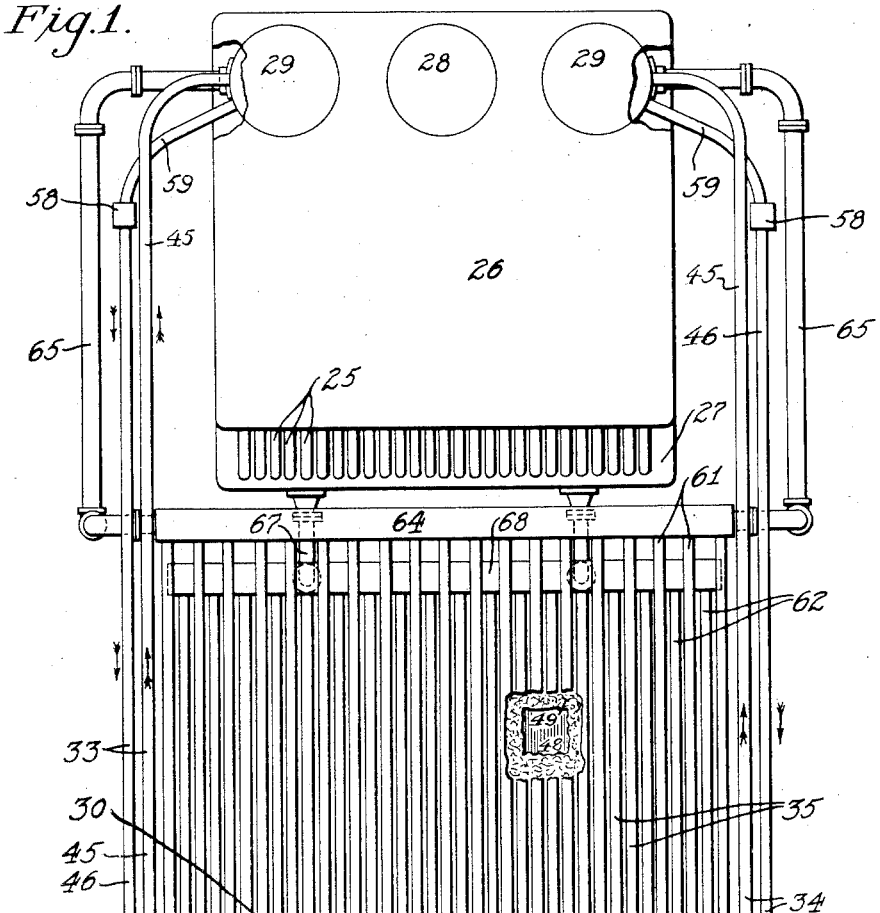
Figure 1A:
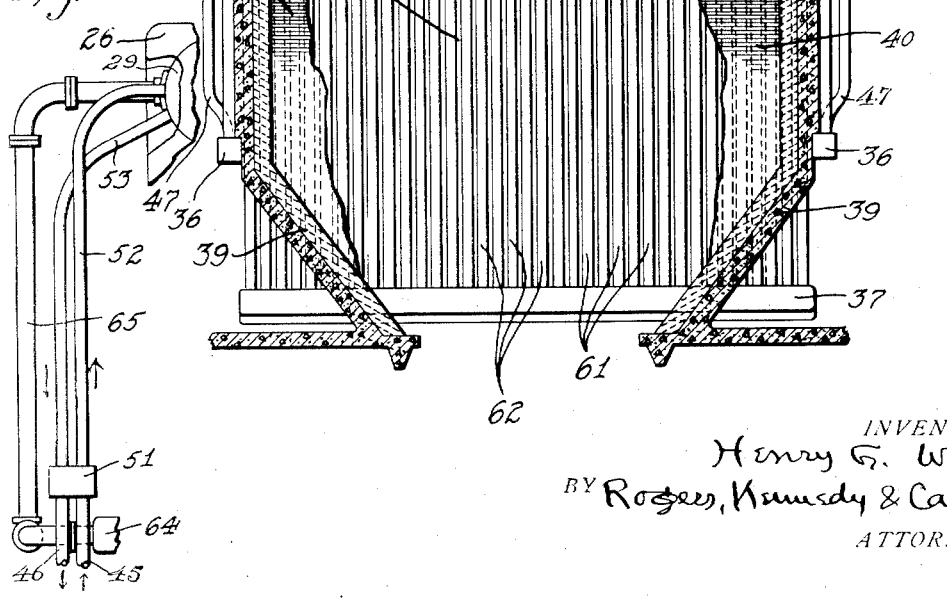

Fig. 13, on a larger scale, shows a horizontal cross section substantially the same as Fig. 4, the upper part of the figure supposed to be facing the fire.

Figs. 14 to 21 inclusive are views corresponding with Fig. 13 showing eight variations of the structure thereof.

Fig. 22 is a view corresponding to Fig. 13 of a different sort of arrangement for positioning and spacing the tubes; Fig. 23 is a perspective view of the refractory block of Fig. 22; and Fig. 24 is an elevation view showing a block in place and a second block being inserted.

While the invention may be employed in connection with any sort of boiler there is shown for illustration a water tube boiler 25 consisting of a bank of substantially horizontal tubes connecting with a front header 26 and a rear header 27 slightly lower than the front one so that the tubes incline slightly. The headers 26 and 27 are extended upwardly and interconnected by a number of drums, there being shown a middle drum 28 and two outer drums 29 at substantially the same level. It is to be understood however that the use of the invention is not confined to these boiler features.

Below the boiler is the combustion space or chamber 30. Fig. 2 indicates a portion of a front wall 31, which may consist of refractory material or may duplicate the rear water wall to be described. Any sort of fuel may be burned in any manner in the combustion chamber, for example coal may be burned upon a stoker, or pulverized coal or other fluid fuel may be injected by a burner 32 and burned within the combustion chamber. The chamber is shown bounded and closed by a left side water wall 33 consisting of upright water tubes, as will be more fully described, a right side water wall 34, and a rear water wall 35. The tubes of each side wall may be interconnected at their lower ends by a header 36 and those of the rear wall by a header 37, which is shown at a lower level than the header 36, the rear wall tubes being bent or slanted inwardly at an angle. A hopper or converging space 38 is shown enclosed between four walls, the slanting side walls 39, the upper parts of which protect the headers 36, the slanting rear wall 40, which protects the inclined lower portions of the rear wall tubes, and the inclined front wall 41, all of which extend upwardly to the level of the floor 42, the hopper discharging downwardly to a suitable ash pit or conveyor.

The general arrangements and the travel of the flames may be varied in accordance with the type of boiler. Flames from pulverized coal, for example may sweep across and upwardly through the combustion space 30 and thence over a baffle 43 and thence down through the rear part of the boiler and if desired to an economizer before passing into the stack.

In referring to tubes, or water tubes, it is intended to include any conduits or passages affording the operation of the invention; for example, if a tube be divided into two passages by a partition, the hotter side may be considered an uptake tube and the cooler side a downtake. In designating a tube or conduit as upright it is not intended to mean vertical, as it might be inclined, curved or crooked, so long as it trends upwardly or downwardly. By the term exposed to the radiant heat is intended to connote water tubes which actually face and receive the radiation of the flames, or are only separated therefrom by conducting material, as iron or silicon carbide directly contacting the tubes so as to transmit effectively and rapidly the received heat to the water circulating in the tubes.

The left water wall 33 is shown composed of a system of inner and outer rows or banks of upright tubes 45 and 46, arranged in staggered relation so that all of the tubes receive radiant heat from the flames, the outer tubes 46 however being less subject to the heat and constituting downtakes. Preferably the several tubes 45 and 46 enter header 36 in alinement, as indicated in Figs. 1-4, and for this purpose each outer tube 46 is formed with a reverse bend or curve 47. The mode of relatively spacing and positioning the tubes is, for clearness, omitted from Figs. 1 and 2 but is indicated in Figs. 3 and 4, and will be more fully described in connection with the subsequent figures. Figs. 1 and 4 indicate an iron outer casing or shell 48, with a filling or lagging 49 between this and the water tubes, consisting for example of asbestos cement or other heat resisting and non-conducting material.

Referring to either of the side water walls this is shown embodying a system of inner tubes or uptakes 45 and outer tubes or downtakes 46. These may be extended upwardly above the combustion chamber and beyond the boiler so as to connect with the steam drum 29, the uptakes thereby conducting steam to the boiler steam spaces and the downtakes bringing water back from the lower part of the drum to the water wall and to the lower ends of the uptakes.

An advantageous arrangement is that shown in Fig. 1$^a$, which is to be considered in connection with Fig. 1, this embodiment giving a quick recirculation of unevaporated water in the tube portions surrounding the combustion space. Thus in addition to the header 36 interconnecting the inner and outer tubes at the bottom there is shown a header or junction 51 which connects the tubes at about the upper level of the combustion chamber or the lower level of the boiler. This common connection or header constitutes a cross passage at this point and permits water ascending in the inner tubes or uptakes 45 to make a short cut across and return downwardly by the outer tubes or downtakes 46, while the steam ascending in the uptakes, is able to pass directly on to the drum through extension uptakes 52, the drum supplying needed water to the header 51 by extension downtakes 53. This form of improvement obviates the carrying of the water ascending in the uptake tubes 45 clear into the drum or boiler before recirculation. The intermediate header 51 acts as a separator or by-pass, permitting the water to separate from the ascending steam and return through the downtake tubes. Analogous cross passages may be provided at several points in various ways for the same purpose. In effect a continuous local circulation of water through elements 36, 45, 51 and 46 is carried on, while the steam produced in this circuit is detached and carried off through the tube 52, and the loss of water from evaporation being made up through the tubes 53. The several tubes 45 and 46 or 52 and 53 are shown entering the header 51 in staggered relation, but may be alined, for example as with headers 36.

In the main views Figs. 1 and 2 a circulatory arrangement is shown in which the drum is the common junction, each of the uptakes 45 of each side wall being carried clear up so as to deliver into the drum; the downtake tubes 46 interconnected near their upper ends by a common header 58, this header in turn being connected with the water space in the drum by a reduced number of downtake extensions 59, as best seen in Fig. 2. By this arrangement the water is fed to the header 58, where it is distributed and passes downwardly through the cooler or downtake tubes 46, exposed however to the flames, and thence into the lower header 36 and through the uptakes 45 back into the steam drum. The header 58 can be omitted and all downtakes 46 run clear from the drum to the lower header 36.

As shown in Figs. 1 and 2 the rear water wall 35 may be composed of inner tubes or uptakes 61 and outer tubes or downtakes 62, all connecting with the lower header 37. Near the top of the combustion chamber the uptake tubes are interconnected by a header 64, from which extends a pipe 65 to the drum 29. In the case of this wall the water may be drawn from the lower side of the boiler rear header 27, through pipe 67 leading to a header 68 at the top of the downtake tubes 62, thus giving an effective circulation.

The mode of joining the several downtakes and uptakes into the lower headers 36 and 37 may be as shown in Figs. 3 and 4, one of the tubes being deflected at 47 so that all of the tubes may enter the header in alinement, thus giving an efficient and compact arrangement. The header may have the usual hand holes opposite the respective tubes for the purpose of expanding the tubes in the header, and the holes may be closed in the usual manner by a cover plate and clamp device 69.

Thus far has been described a complete steam generating plant embodying the main principles and features of the present invention, but since the structure may be modified in many respects, for example, in the ways indicated in the other figures, reference will next be made to the details and features disclosed in such other figures. First will be referred to Figs. 5 to 11 showing modifications in the lower headers or means of interconnecting the lower ends of the several downtake and uptake tubes of the water wall.

Thus Fig. 5 shows a modification over Fig. 3 wherein both the uptake $45^a$ and downtake $46^a$ are curved or bent near their lower ends, so as to enter in alinement into a header $36^a$, which will thus be symmetrically centered with respect to the two banks of tubes.

Figs. 6 and 7 show a modification in which the tubes $45^b$ and $46^b$ are arranged to enter the header $36^b$ in staggered arrangement, thus requiring a header of additional width but permitting closer spacing of the tubes. This modification also shows an improvement wherein the downtake tubes $46^b$ are of smaller diameter than the uptakes giving a more compact arrangement, and the smaller tubes being sufficient for carrying downwardly the water which is to expand by evaporation in the uptakes. As before the downtakes are exposed to the flames through the spaces between the successive uptakes, but less exposed than the uptakes because partly shielded thereby, the downtakes assisting the absorption of radiant heat, and bringing the water in very hot condition to the uptakes, thus promoting evaporation therein.

Instead of having a common lower header for all of the downtake and uptake tubes of each water wall, there may be a series of separate or individual headers in the nature of couplings each having connection with only a small group or number of tubes. For example Figs. 8 and 9 show an arrangement whereby each one of the uptakes $45^c$ is connected with only one of the adjacent downtakes $46^c$, namely through an individual or diagonal passage or header $36^c$. This makes a very effective circulating arrangement for a water wall such as disclosed; each uptake pipe being supplied at its lower end directly from the individual header, coupling or bend, fed by the downtake. The coupling might be replaced by a simple U-bend integral with both tubes.

A partly similar arrangement is indicated in Figs. 10 and 11 wherein each uptake $45^d$ and a downtake $46^d$ are interconnected by a forked coupling or header $36^d$, this being set on a diagonal the same as in Fig. 8. The hand holes of the individual headers may be closed by devices $69^d$, unless it is desired to interconnect the several individual couplings by a comon pipe or header.

It is desirable to provide means for holding in proper relation and alinement the several individual headers $36^c$, $36^d$ or the like, and the individual tubes of the water wall. For this purpose there is shown in each of Figs. 8, 10, and 12 a clamping strap or yoke 70 passing around each of the outer or downtake tubes, these several straps being connected to a longitudinal structural bar or channel iron 71 by means of nuts 72 applied to the threaded ends of the straps; this mounting affording a very effective and firm water wall.

In order to render the water wall closed against exit of flames between the tubes, and to strengthen and rigidify the tube system, various arrangements may be employed, preferably such as to leave the uptake tubes 45 largely exposed to the flames, and the downtake tubes 46 exposed to a substantial but less extent. Thus in Figs. 3, 4 and 13 is shown a construction wherein wings, ribs or fins 80 are arranged or welded at the outer sides of the uptake tubes 45, namely at the points 81, each extending diagonally outward so as to contact or form a butt joint with one of the outer or downtake tubes 46. These fins effectually close the spaces between the staggered tubes, while at the same time leaving all the tubes exposed to the flames, as explained, the uptakes more than half exposed, the downtakes less than half exposed. The fins moreover are so disposed as to be largely protected from the flames, so as to minimize their destruction. They assist to conduct the radiant heat to the tubes.

Fig. 14 shows a modification wherein the fins 83 are welded upon the outer or downtake tubes at the points 84, and have mere abutting contact with the uptake or inner tubes, the result being similar to that of Fig. 13, but cheapening the replacement of burned out uptakes. A stronger construction may be as shown in Fig. 15, wherein the fins 86 are formed with flanges or feet 87 spot welded at 88 to the downtake tubes. A modification of this form is shown in Fig. 16 wherein the fins 89 have flanges or feet 90 which are not welded but are removably secured by a clamp 91 to the downtake tubes. This permits the fins to be inserted after the wall is built, a number of clamps 91 being applied and tightened up by screws 92. The clamping means are well protected from injury from the flames. By the use of detachable fins clamped in place ready removal and replacement of injured fins may be effected, without the need of removing the tubes themselves.

A modification of the wall closure is shown in Fig. 17 wherein a strip or angle of metal 94, of V-shape in cross section, is shown centrally welded at 95 to one of the downtake tubes, the two sides of the V extending diagonally to the two nearest uptake tubes. In this case there will be reduced heating of the downtake tubes because the transmission is only indirect, by conduction through the iron double fin 94. In Fig. 18 is shown a modification wherein a zigzag or corrugated wall plate 97 is inserted between the inner and outer rows of water tubes, namely in a manner to contact all of them and brace them in position.

These arrangements may be modified by introducing a heat conducting face plate 99 as shown in Fig. 19. This is preferably a cast iron plate shaped to fit snuggly at the inner sides of the uptake tubes, thus protecting them from the direct action of the flames, the tubes however being exposed indirectly to the radiant heat through conduction, sufficient to produce evaporation and carry off the radiant heat. While the evaporation may be somewhat decreased in this structure of water wall, its life is prolonged as the tubes are protected from direct action of the flames. The face plates 99 may be secured in various ways, for example each plate may have an outwardly extending stem or post 100 formed or perforated to receive a clamp, comprising a strap 101 which is shown formed as a yoke straddling the downtake tube 46 and secured thereto by a cross bar 102 and nuts 103 on the threaded ends of the yoke. The bar 102 may be prolonged across the wall and serve for all the downtake tubes, in the manner disclosed in Figs. 8, 10 and 12. Fig. 20 shows a modification of Fig. 19 wherein the conducting face plate 99$^a$ is so shaped as to close the space between the uptake tubes but to leave each of those tubes partly exposed directly to the flames. Fig. 21 shows a further modification in which the plate 99$^c$ is reduced in width and drawn in almost to the diameters of the uptake tubes, while abutting against a downtake. In these several cases the described elements serve to interconnect the downtake and uptake tubes and increase the strength and effectiveness of the water wall, as well as conducting heat to the tubes.

Figs. 22, 23 and 24 show a different sort of arrangement wherein refractory blocks 106 are inserted so as to occupy the space between one of the uptake tubes and the two adjacent downtake tubes. The preferred shape of one of these blocks in indicated in Fig. 23, wherein the outer face 107 is shown as square in form, while the inner extension 108 is shown tapered, with its apex abutting against the uptake tube. Each side of the block is circularly recessed at 109 to enclose snugly the downtake tubes. In order to enable the insertion of these blocks after the wall has been erected each of the recesses 109 is cut away at 110 in a curved manner, the cutaway portions being for example at the upper left side of the block and at the lower right side, as indicated by the dotted lines. This shape enables the block to be inserted in upright position from the exterior between two of the downtake tubes and swung around as indicated in Fig. 24 into its intended position, the curves 110 being calculated so that the horizontal diameter of the block, during the swinging movement, is at no point greater than the distance between the tubes. An entire column of these blocks 106 may thus be inserted behind each uptake tube and mounted one above the other throughout the entire height of the combustion chamber or for the full extent of the water tubes. The arrangement not only closes the wall against egress of flames, but suitably exposes both the uptake and downtake tubes to the flames. The blocks may be constructed of ordinary clay refractory material, but preferably are of conducting refractory such as silicon carbide or cast iron, increasing the heat transmission to the downtake tubes. They may be used in connection with a fin structure substantially as shown in Figs. 13 to 17.

There has thus been described a water wall for furnaces which embodies the principles and attains the advantages of the present invention. Since many matters of construction, arrangement, operation, combination and detail may be variously modified without departing from the principles it is not intended to limit the invention to such matters except in so far as set forth in the appended claims.

What is claimed is:

1. A boiler furnace water wall embodying a system of uptake and downtake tubes or passages connected with the boiler and arranged so that the downtakes receive water and deliver it to the lower end of the uptakes, the uptakes being at least as numerous as the downtakes and directly exposed to the radiant heat of the furnace and spaced apart by more than the diameter of an uptake, while the downtakes are spaced outwardly thereof in line with the spaces between the uptakes to receive radiant heat of the furnace between the spaced apart uptakes but less heat than the uptakes, and wall closing means between the uptakes and downtakes.

2. A boiler furnace water wall embodying a system of uptake and downtake tubes or passages so connected with the boiler that the downtakes receive water from the boiler and deliver it to the lower ends of the uptakes while the uptakes deliver steam to the boiler, the downtakes being outwards of and staggered with relation to the uptakes, and wall closing fins extending between the uptakes and downtakes arranged to expose both to the heat of the furnace but the downtakes less than the uptakes.

3. A boiler furnace water wall embodying a system of uptake and downtake tubes or passages so connected with the boiler that the downtakes receive water from the boiler and deliver it to the lower ends of the uptakes while the uptakes deliver steam to the boiler, the uptakes being spaced apart more than the diameter of an uptake and the downtakes being spaced outwards of and staggered with relation to the uptakes, and wall closing means extending from uptakes to downtakes and arranged to expose both uptakes and downtakes to the radiant heat, but the downtakes less than the uptakes.

In testimony whereof, I have affixed my signature hereto.

HENRY G. WOLFE.